United States Patent [19]

Misawa

[11] Patent Number: 5,694,249
[45] Date of Patent: Dec. 2, 1997

[54] THREE-DIMENSIONAL OPTICAL MEMORY ELEMENT AND METHOD OF WRITING INFORMATION THEREIN

[75] Inventor: Hiroaki Misawa, Tokushima, Japan

[73] Assignee: Central Glass Company, Limited, Yamaguchi, Japan

[21] Appl. No.: 538,490

[22] Filed: Oct. 3, 1995

[51] Int. Cl.⁶ .............................. G02B 27/10; G02B 3/00
[52] U.S. Cl. ................................ 359/620; 359/652
[58] Field of Search ............................ 359/620, 619, 359/652, 653, 654, 296; 369/288

[56] References Cited

U.S. PATENT DOCUMENTS

| | | | |
|---|---|---|---|
| 3,651,488 | 3/1972 | Amodei | 365/117 |
| 4,247,914 | 1/1981 | Brody | 365/109 |
| 4,858,185 | 8/1989 | Kowshik et al. | |
| 5,237,219 | 8/1993 | Cliff | 307/465 |
| 5,247,478 | 9/1993 | Gupta et al. | 365/185 |
| 5,272,368 | 12/1993 | Turner et al. | 257/315 |
| 5,353,248 | 10/1994 | Gupta | 365/154 |
| 5,559,784 | 9/1996 | Ota | 369/124 |

OTHER PUBLICATIONS

"iFX740 10 ns FLEXlogic FPGA with SRAM Option," Intel Corporation product bulletin, Nov. 1993.

Kawata, Y., et al., "Three Dimensional Optical Memory with a Photorefractive Crystal," *The Fortieth Shunki Oyo Butsuri Gakkai Koen Yokoh Shuh*, 1993, p. 900.

Kawata, et al., "Three Dimensional Confocal Optical Memory Using Photorefractive Materials," SPIE, vol. 2042, 1993, pp. 314–325.

Hunter, et al., "Potentials of Two-Photon Based 3-D Optical Memories for High Performance Computing," *Applied Optics*, May 1990, vol. 29, No. 14, pp. 2058–2066.

*Primary Examiner*—David C. Nelms
*Assistant Examiner*—Ricky Mack
*Attorney, Agent, or Firm*—Keck, Mahin & Cate

[57] ABSTRACT

The invention relates to a three-dimensional optical memory element. This element is made of glass and includes: a glass matrix which has a first refractive index; and a plurality of spots which are three-dimensionally distributed in the glass matrix and each of which has a second refractive index different from the first refractive index. The element is prepared by condensing a pulsed laser beam to focal points in the element so as to prepare, at the focal points, the spots corresponding to the focal points. Each focal point has a diameter which is approximately equal to a wavelength of the pulsed laser beam. The element has a sufficient weatherability and a sufficient resistance to heat and light. It is possible to write information at each spot having a diameter equal to or shorter than the wavelength of the laser beam, with high density and good contrast.

11 Claims, 1 Drawing Sheet

THREE-DIMENSIONAL OPTICAL MEMORY ELEMENT AND METHOD OF WRITING INFORMATION THEREIN

BACKGROUND OF THE INVENTION

The present invention relates to a three-dimensional optical memory element and a method of writing information therein.

A demand for an optical memory element with larger memory capacity has been recently increasing. Thus, in recent years, research and development thereon has been actively conducted. For the purpose of making the memory capacity larger, there is provided a method in which the laser beam wavelength is shortened for increasing memory density. However, according to this method, as the wavelength is shortened, the laser beam absorption by the optical memory element is more increased. Thus, according to this method, it is considered that the future minimum wavelength of the laser beam becomes about a half of the current minimum wavelength (i.e. about half of about 780 nm). The bit size is limited by the diffraction limit at a certain wavelength. Therefore, it is considered that the upper limit of the future memory density becomes only about four times the current memory density.

In view of the drawback of the above method, there is proposed another method in which information is written in the memory in three-dimensions, instead of the two-dimensional writing, for making the memory capacity larger. In this method, there are proposed several materials for the optical memory element. For example, Hunter et al. (1990) Applied Optics vol. 29, No. 14, pp. 2058–2066 discloses a prototype photochromic molecule, a spirobenzopyran, embedded in a polymer matrix. This molecule absorbs initially only in the UV region, undergoes, on excitation, structural changes via heterolytic cleavage, and absorbs in the visible region also. Due to this two-photon nature of this molecule, when the memory is irradiated with the information and addressing beams which have different wavelengths and meet at right angles, only the intersection of these beams changes in refractive index. However, in case that the photochromic memory is used, the photoreaction may proceed by the reading light beam, and thus the stored information may be destroyed.

Kawata et al. (1993) Proc. SPIE vol. 2042, 18 discloses a three-dimensional confocal optical memory using photorefractive materials. This photorefractive material is an organic photopolymer prepared by irradiating two kinds of light-polymerizable monomers (i.e. a methacrylic compound and an allyl compound) with light and then by preferentially polymerizing the methacrylic compound having a higher light polymerization rate than that of the allyl compound. However, in case that the photopolymerization is used, it is difficult to conduct a high-speed writing in the memory.

Kawata et al. (1993) The fortieth Shunki Oyo Butsuri Gakkai Koen Yokoh Shuh, p. 900 discloses a three-dimensional optical memory with a photorefractive crystal made of Fe-added $LiNbO_3$. This memory is prepared by focusing an Ar laser beam in the crystal and by three-dimensionally scanning the crystal with this beam so as to change the focal points in refractive index. However, in case that the photorefractive crystal is used, it is necessary to solve a problem of aberration compensation for the purpose of preparing a three-dimensional memory with high-density. This problem is caused by the optical anisotropism and occurs when the light is focused in the crystal.

SUMMARY OF THE INVENTION

It is therefore an object of the present invention to provide a three-dimensional optical memory element and a method of writing information therein, which are free from the above-mentioned drawbacks.

It is a more specific object of the present invention to provide a three-dimensional optical memory element with high density and good contrast, which has a sufficient weatherability and a sufficient resistance to heat and light, and a method of writing information in the element, without having a problem of aberration compensation.

According to a first aspect of the present invention, there is provided a three-dimensional optical memory element which is made of glass, said element comprising:

a glass matrix which has a first refractive index; and a plurality of spots which are three-dimensionally distributed in said glass matrix and each of which has a second refractive index different from said first refractive index.

According to a second aspect of the present invention, there is provided a method of writing information in a three-dimensional optical memory element having a glass matrix, said method comprising the steps of:

(a) condensing a pulsed laser beam in said glass matrix having a first refractive index;

(b) during the step (a), three-dimensionally scanning said glass matrix with said pulsed laser beam, such that a plurality of spots which are three-dimensionally distributed in said glass matrix and each of which has a second refractive index different from said first refractive index are prepared.

In the invention, the three-dimensional optical memory element is made of glass. Therefore, this element has a sufficient weatherability and is more resistant to heat and light than elements made of organic polymer or the like. Thus, it is possible to stably store information for a long time in the element of the present invention. Furthermore, it is not necessary to conduct a special aberration compensation because glass matrix does not have anisotropism.

In the invention, it is possible to write information (i.e. to change the refractive index) at each spot having a diameter equal to or shorter than the wavelength of the laser beam, with high density and good contrast, by condensing the laser beam to a focal point having a diameter which is approximately equal to the wavelength of the laser beam.

BRIEF DESCRIPTION OF THE DRAWINGS

The figure is a diagram showing a system for preparing a three-dimensional optical memory element of the present invention.

DESCRIPTION OF THE PREFERRED EMBODIMENTS

Figure 1:
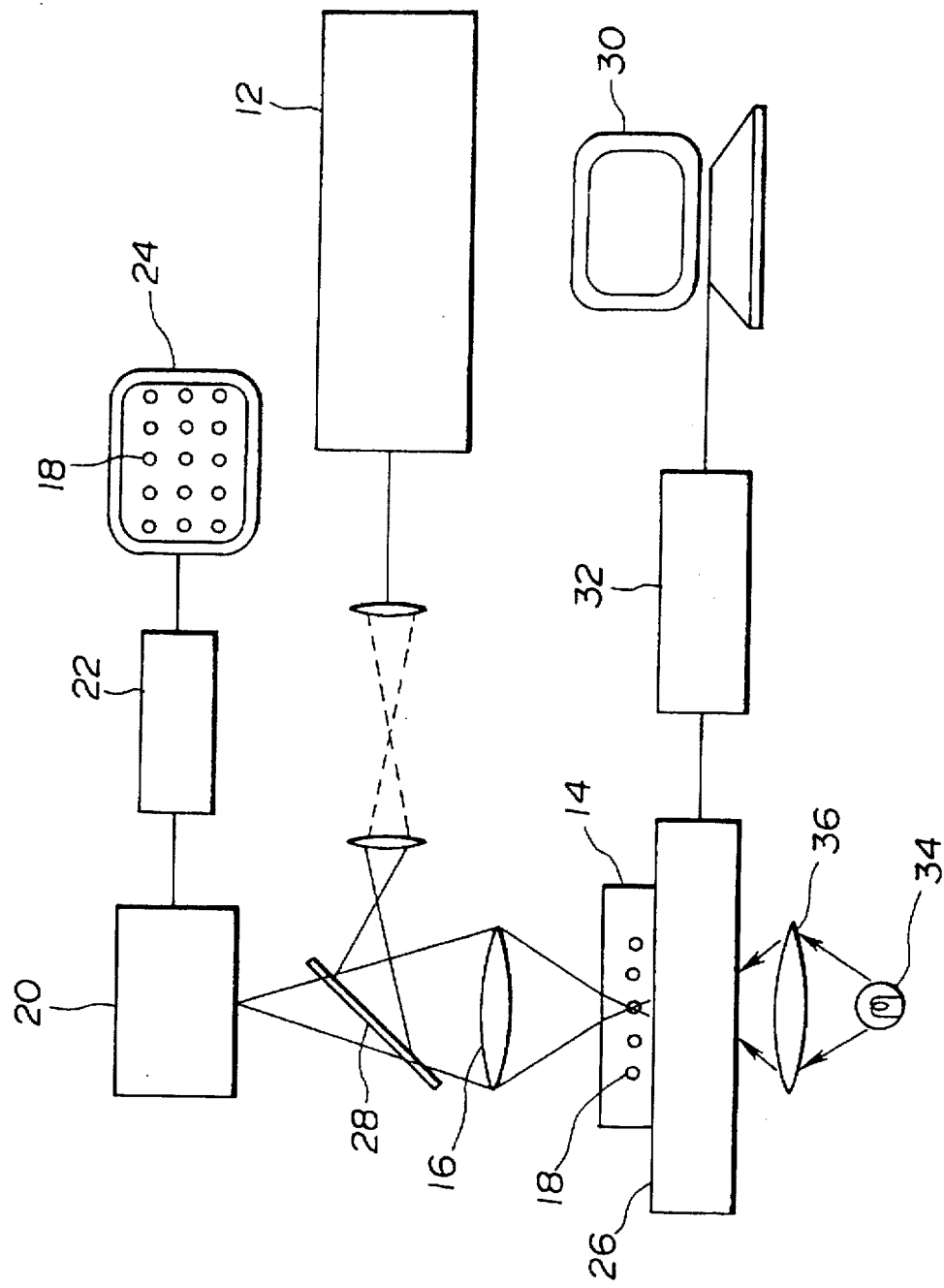

According to the present invention, there is provided a three-dimensional optical memory element which is made of glass. This element comprises a glass matrix which has a first refractive index, and a plurality of spots which are three-dimensionally distributed in the glass matrix. Each spot has a second refractive index that is different from the first refractive index. In other words, this element has a three-dimensional structure made up of a plurality of layers. Each layer is made up of the spots that are two-dimensionally distributed in the glass matrix.

According to the present invention, a method of writing information in the element comprises the steps of: (a)

condensing a pulsed laser beam in the glass matrix; and (b) during the step (a), three-dimensionally scanning the glass matrix with the pulsed laser beam. With this method, the above-mentioned spots are formed. At each spot, the light-induced change of refractive index occurs by the condensation of the pulsed laser beam. It is considered that this change is caused by the rearrangement of free charge originating from defects.

During the step (a) of the method, the pulsed laser beam is condensed to focal points in the element so as to form the spots corresponding to the focal points. This focal point has the minimum diameter which is approximately equal to the wavelength of the pulsed laser beam. In the invention, it is possible to obtain the spots each having a diameter equal to or shorter than the wavelength of the pulsed laser beam, by suitably lowering the laser beam strength.

In the invention, it is preferable that the pulsed laser beam has a wavelength of 532 nm. In the invention, the glass matrix is not limited to a particular type. As the glass matrix, so-called multi-component glass has a lower writing threshold than that of silica glass, and silica glass has a smaller writing spot size than that of the multi-component glass, in case that the same energy density is used for both glasses. In the invention, it is preferable to use a silicate glass or a silica glass as the glass matrix.

The present invention is illustrated by reference to the following nonlimitative Examples 1 and 2.

EXAMPLE 1

In this example, at first, a preliminary test for writing information in a glass, matrix was conducted as follows.

As is seen from the figure, as the writing laser beam, a picosecond pulsed laser beam having a wavelength of 532 nm and about 30-ps pulses, which is the second harmonic of a Q-switched Nd-doped YAG laser beam, was produced by a laser device 12. This picosecond pulsed laser beam was condensed to a focal point which has a diameter of about 600 nm and is positioned in a glass matrix 14, using an oil-immersed objective 16 having a numerical aperture of 1.30 and 100 magnifications. With this condensation, it was confirmed that a minute spot 18 having a refractive index different from that of the glass matrix 14 had been formed. The glass matrix 14 had three dimensions of 15 mm, 15 mm, and 0.17 mm, a chemical composition of 68.1 wt. % $SiO_2$, 12.1 wt. % $Na_2$, 6.6 wt. % $K_2O$, 5.0 wt. % ZnO, 4.3 wt. % $Al_2O_3$, and 3.9 $TiO_2$, a refractive index of 1.48, and a softening temperature of 800° C. The image of the minute spot 18 was recorded by a CCD camera 20 and a videotape recorder 22 to measure the diameter of the spot 18 on a monitor 24. In case that the laser beam strength was 420 $J/cm^2$, the diameter of the spot was 600 nm. Furthermore, it was confirmed that the formation of a spot having a diameter shorter than the wavelength of the laser beam becomes possible by lowering the laser beam strength.

After the above-mentioned preliminary test, a three-dimensional memory element of the present invention was prepared as follows. At first, the glass matrix 14 was placed on an electrically-driven stage 26 that is scannable in the directions of X, Y, and Z axes. Then, similar to the preliminary test, a picosecond pulsed laser beam 10 having a strength of 800 $J/pulse/cm^2$ was condensed to focal points in the glass matrix 14, while the glass matrix 14 was scanned in the directions of X and Y axes and fixed at a position in the direction of Z axis. With this, a layer of the minute spots 18 each having a diameter of 800 nm was two-dimensionally formed on a surface defined by the X and Y axes. Then, the stage 26 was moved by 4 μm in the direction of Z axis. Then, another layer of the minute spots 18 was similarly formed on another surface defined by the X and Y axes. Thus, a plurality of the minute spots 18 which are three-dimensionally distributed in the glass matrix 14 were formed.

As is seen from the Figure, there have been used, in known ways, a dichroic mirror 28, a computer 30 for controlling the movement of the stage 26, a driver 32 for connecting the computer 30 with the stage 26, a lamp 34, and a condenser lens 36.

The thus prepared element was allowed to stand still outside for one month and exposed to the sunlight. After this test, it was confirmed that the element had not changed in refractive index distribution and that the glass matrix had not degenerated in quality. Furthermore, even in case that the thus prepared element was put in an atmosphere of 300° C. for 24 hr, the element did not change in refractive index distribution, and the glass matrix did not degenerate in quality.

EXAMPLE 2

In this example, Example 1 was repeated except in that a silica glass having a purity of at least 99.8%, a refractive index of 1.46, and a softening temperature of 1,500° C. was used as the glass matrix, that the moving distance in the direction of Z axis by one movement was 5 μm, and that the pulsed laser beam strength was 3,586 $J/pulse/cm^2$.

As a consequence, a plurality of minute spots each having a diameter of 385 nm smaller than 532 nm, the wavelength of the laser beam, and a refractive index different from that of the glass matrix were three-dimensionally formed in the glass matrix.

What is claimed is:

1. A three-dimensional optical memory element which is made of glass, said element comprising:

a glass matrix which has a first refractive index; and a plurality of spots which are three-dimensionally distributed in said glass matrix and each of which has a second refractive index different from said first refractive index.

2. An element according to claim 1, wherein said glass matrix is made of one of a silica glass and a silicate glass.

3. A three-dimensional optical memory element which is made of glass, said element comprising:

a glass matrix which has a first refractive index; and a three-dimensional structure having a plurality of layers, each of said layers including a plurality of spots two-dimensionally distributed in said glass matrix, each of said spots having a second refractive index different from said first refractive index.

4. A three-dimensional optical memory element which is made of glass, said element comprising:

a glass matrix which has a first refractive index; and a plurality of spots which are three-dimensionally distributed in said glass matrix and each of which has a second refractive index different from said first refractive index, wherein said element is prepared by condensing a pulsed laser beam to focal points in said element so as to prepare, at said focal points, said spots corresponding to said focal points, each focal point having a diameter which is substantially equal to a wavelength of said pulsed laser beam, each spot having a diameter which is equal to or shorter than said wavelength of said pulsed laser beam.

5. An element according to claim 4, wherein said wavelength of said pulsed laser beam is 532 nm.

6. An element according to claim 4, wherein said glass matrix is made of a member selected from the group consisting of a silica glass and a silicate glass.

7. A method of writing information in a three-dimensional optical memory element having a glass matrix, said method comprising the steps of:
- (a) condensing a pulsed laser beam in said glass matrix having a first refractive index;
- (b) during the step (a), three-dimensionally scanning said glass matrix with said pulsed laser beam, such that a plurality of spots which are three-dimensionally distributed in said glass matrix and each of which has a second refractive index different from said first refractive index are prepared.

8. A method according to claim 7, wherein said glass matrix is made of one of a silica glass and a silicate glass.

9. A method of writing information in a three-dimensional optical memory element having a glass matrix, said method comprising the steps of:
- (a) condensing a pulsed laser beam in said glass matrix havinq a first refractive index;
- (b) during the step (a), three-dimensionally scanning said glass matrix with said pulsed laser beam, such that a plurality of spots which are three-dimensionally distributed in said glass matrix and each of which has a second refractive index different from said first refractive index are prepared, wherein, during the step (a), said pulsed laser beam is condensed to focal points in said element so as to prepare, at said focal points, said spots corresponding to said focal points, each focal point having a diameter which is substantially equal to a wavelength of said pulsed laser beam, each spot having a diameter which is equal to or shorter than said wavelength of said pulsed laser beam.

10. An element according to claim 9, wherein said wavelength of said pulsed laser beam is 532 nm.

11. A method according to claim 9 wherein said glass matrix is made of a member selected from the group consisting of a silica glass and a silicate glass.

* * * * *